(No Model.)
H. W. MAURER.
THERMOMETER.
No. 525,915. Patented Sept. 11, 1894.
FIG. 2. FIG. 1. FIG. 3.
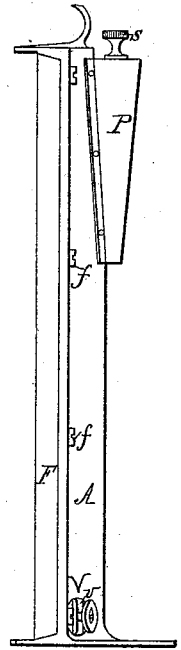
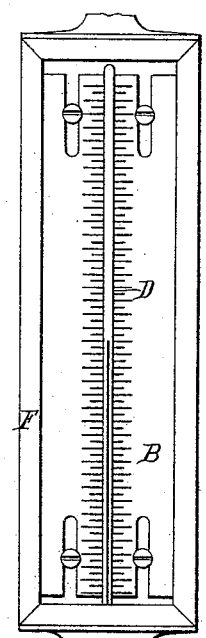
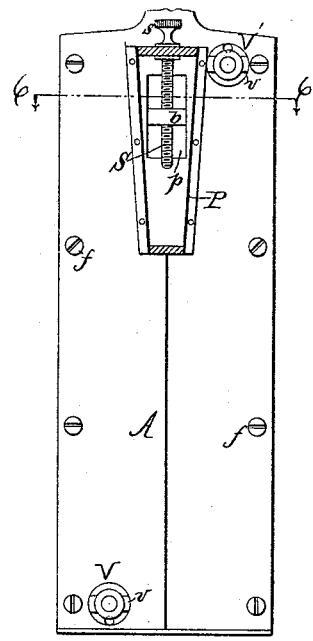
FIG. 6.
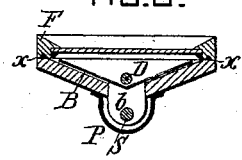
FIG. 5.
FIG. 4.
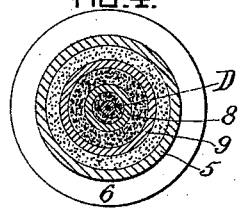
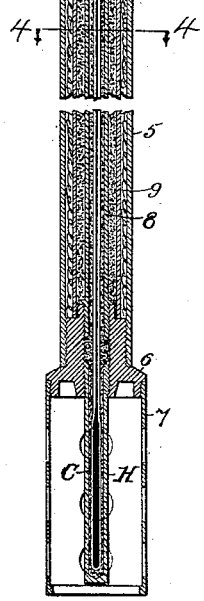
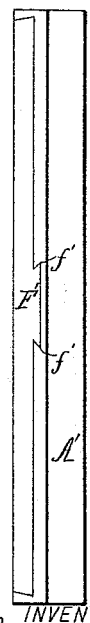
WITNESSES:
George Baumann
S. C. Connor
INVENTOR
Henry W. Maurer
BY
Howson and Howson
ATTORNEYS
THE NORRIS PETERS CO., PHOTO-LITHO., WASHINGTON, D. C.

UNITED STATES PATENT OFFICE.

HENRY W. MAURER, OF BAY RIDGE, NEW YORK.

THERMOMETER.

SPECIFICATION forming part of Letters Patent No. 525,915, dated September 11, 1894.

Application filed July 29, 1893. Serial No. 481,823. (No model.)

*To all whom it may concern:*

Be it known that I, HENRY W. MAURER, a citizen of the United States of America, and a resident of Bay Ridge, (Utrecht,) Kings county, New York, have invented Improvements in Thermometers, of which the following is a specification.

My invention consists of improvements in the construction of thermometers, some of my improvements being more especially adapted for use on high grade thermometers, that is, those designed for indicating high temperatures.

In the accompanying drawings, Figure 1 is a view of a thermometer embodying my improvements, the upper part of the thermometer being shown in outside face view, while the lower part is in section. Fig. 2 is an edge view of the head or upper part of the thermometer. Fig. 3 is a rear view of the same parts in section. Fig. 4 is a transverse section on the lines 4—4, Fig. 1, but drawn to an enlarged scale. Fig. 5 is an edge view of a modification; and Fig. 6 is a sectional plan view on the line 6—6, Fig. 3.

As shown in the drawings, the head casing A, which is preferably of metal, is of a flattened V-section, and the graduated scale plate B is of corresponding angle. The upper part of the thermometer tube D is received within the angle in front of the graduated plate, as shown in Figs. 1 and 6. The front of this casing is closed by a glass plate held within a detachable frame F, preferably also of metal, which is so secured to the casing as to make a practically tight joint all round. In the construction shown in Figs. 1, 2 and 6, this frame carrying the glass is simply set in the casing from the front and held by screws $f$, suitable packing such as is indicated at $x$ in Fig. 6 being placed all around the edge of the frame F, where it fits against the casing to make a tight joint. In Fig. 5, however, I have shown a modification of this construction, the frame F' carrying the glass being in this case provided with dovetails $f'$ so that the frame can be slid in sidewise into corresponding dovetail or undercut grooves in the face of the casing A', as will be readily understood.

It will sometimes happen that moisture will gather on the inner face of the glass in the frame F, (F') and obstruct the reading of the indications. I therefore provide two vent openings V and V' which are normally closed by valves $v$ somewhat in the form of turn-buckles. These vent openings are in the back of the casing A and one of them is near the top and the other near the bottom, and when the valves or turn-buckles $v$ are turned to the position indicated in Fig. 2, the openings are entirely closed, so that the exterior atmosphere cannot get into the interior of the casing. When, however, the valves are turned to the position shown in Fig. 3, the vents are open, so that air can circulate in the interior of the casing and the moisture on the inner face of the glass be carried off.

The readings of any thermometer will change with continued use and this is particularly the case with thermometers which are subjected to very high temperatures. I therefore construct the thermometer so that it can be readjusted to compensate for this variation of the glass tube and this without the need of taking the instrument apart or even opening the glass front. I provide means whereby the graduated scale plate can be adjusted from the outside of the casing. These adjusting means may vary but I prefer to employ the devices illustrated in the drawings. On the back of the scale plate B is a projecting lug $b$ passing through a slot $p$ in the casing and threaded for the reception of the threaded portion of an adjusting stem S, which turns in bearings in the upper part of a hollow projection P at the back of the casing. By turning the thumb nut $s$ of the stem S on the outside of the casing, therefore, the scale plate within the casing can be adjusted vertically to compensate for the change in the reading which follows the use of the instrument. This means for adjusting the scale plate from the outside of the casing is also a convenience in the original setting of the instrument.

It is customary where the lower bulb of the thermometer is inclosed within a metal sheath to provide a conducting bath of mercury between the metal sheath and the glass bulb. In high grade thermometers, however, the excessive temperatures tend to vaporize the mercury forming this bath, the vapors passing up through the packing into the upper part of the frame. To avoid this difficulty I use finely powdered or dust copper C or other suitable metal, which I pack in to the metal sheath H around the bulb of the mercury tube as shown in Fig. 1. By the expression "powdered or dust" metal, I contemplate such fine impalpable metal powder as is obtained by a process of precipitation, the metal preferred being in fact a precipitate of copper, which can be packed solidly around the thermometer bulb to give the necessary conductive property.

Where thermometers, particularly high grade thermometers, are made with long stems for use in various manufactures, and particularly for ascertaining the temperature of liquids, inaccurate readings are apt to follow because of the immersion of the stem of the thermometer to different extents into the liquid. To insure accurate readings, irrespective of the extent of the immersion of the stem in the liquid, I insulate that part of the mercury tube which lies between the bulb and the head of the thermometer. To make this insulation thorough, I prefer to construct it as shown in Figs. 1 and 4. First there is an outer metal casing 5 screwed at one end to the lower part of the head of the thermometer or a part connected therewith, and having screwed to its lower end the fitting 6, which carries the perforated guard 7 for the inclosing sheath H of the mercury bulb. This fitting 6 carries the bulb-inclosing sheath and the packing therefor.

Between the outer metal tube and the central glass mercury tube I arrange one or more tubes preferably of glass. In the construction shown I have provided two such glass tubes 8 and 9 suitably spaced from each other. I further provide packing, preferably of asbestos, in the space between the mercury tube and the glass inclosing tube and also in the spaces between the several tubes. This packing may be arranged lightly or packed closely as occasion may show to be desirable.

I claim as my invention—

1. A closed thermometer casing provided with vent openings to the atmosphere and valves to open and close them, as and for the purpose set forth.

2. A thermometer having a metal sheath for the mercury bulb and containing metal in the form of powder or dust packed around the bulb within the inclosing sheath, as and for the purpose described.

3. A thermometer having a metal sheath for the mercury bulb and containing dust copper packed around the bulb within the inclosing sheath, as and for the purpose described.

4. A long-stem thermometer having insulation applied to the stem of the mercury tube from the bulb to the thermometer head.

In testimony whereof I have signed my name to this specification in the presence of two subscribing witnesses.

HENRY W. MAURER.

Witnesses:
J. C. ROSS,
HUBERT HOWSON.